(12) United States Patent
Honda et al.

(10) Patent No.: US 9,928,084 B2
(45) Date of Patent: Mar. 27, 2018

(54) ELECTRONIC DEVICE AND METHOD FOR ACTIVATING APPLICATION

(75) Inventors: Natsuhito Honda, Kanagawa (JP); Saya Shigeta, Kanagawa (JP)

(73) Assignee: KYOCERA CORPORATION, Kyoto (JP)

(*) Notice: Subject to any disclaimer, the term of this patent is extended or adjusted under 35 U.S.C. 154(b) by 1594 days.

(21) Appl. No.: 13/527,864

(22) Filed: Jun. 20, 2012

(65) Prior Publication Data
US 2012/0256832 A1 Oct. 11, 2012

Related U.S. Application Data

(63) Continuation-in-part of application No. 13/498,406, filed as application No. PCT/JP2010/066702 on Sep. 27, 2010, now abandoned.

(30) Foreign Application Priority Data

Sep. 28, 2009 (JP) .................................. 2009-223527
Oct. 27, 2009 (JP) .................................. 2009-246362

(51) Int. Cl.
G06F 9/44 (2006.01)

(52) U.S. Cl.
CPC .................................. *G06F 9/4443* (2013.01)

(58) Field of Classification Search
USPC .................................. 715/705, 234, 255, 256
See application file for complete search history.

(56) References Cited

U.S. PATENT DOCUMENTS

2002/0069068 A1* 6/2002 Nemoto ............... G09B 21/007
704/271
2007/0130535 A1* 6/2007 Demaio ................ G06F 3/0482
715/779

(Continued)

FOREIGN PATENT DOCUMENTS

JP 2005-352730 A 12/2005
JP 2006-345337 A 12/2006

(Continued)

OTHER PUBLICATIONS

"ElasticDog.com: Beginning Factor—Introduction", referred to as FactorRef in the Office Action, retrieved from https://web.archive.org/web/20090819141009/http://elasticdog.com/2008/11/beginning-factor-introduction/.*

(Continued)

*Primary Examiner* — Stephen Hong
*Assistant Examiner* — Sanchita Roy
(74) *Attorney, Agent, or Firm* — Hauptman Ham, LLP

(57) ABSTRACT

An electronic device is provided with an activation unit for activating an application wherein character input to a character input area is possible, a memory for storing a predetermined character string corresponding to the application, an operation unit for inputting a first character string and a second character string, a display unit for displaying the first character string and the second character string input from the operation unit, a determination unit for determining whether or not the second character string matches the predetermined character string, and a control unit which, when the determination unit determines that the second character string matches the predetermined character string, functions to control an activation unit to activate an application corresponding to the predetermined character string (Continued)

and functions to input the first character string in the character input area of the application.

10 Claims, 15 Drawing Sheets

(56) References Cited

U.S. PATENT DOCUMENTS

| | | |
|---|---|---|
| 2007/0271293 A1 | 11/2007 | Peng |
| 2008/0133487 A1* | 6/2008 | Gross ................ G06F 17/30864 |
| 2009/0058816 A1 | 3/2009 | Takeuchi |
| 2009/0089654 A1* | 4/2009 | Wittig .................. G06Q 10/107 |
| | | 715/223 |
| 2010/0325122 A1* | 12/2010 | Yassin ........................ G06F 8/60 |
| | | 707/759 |

FOREIGN PATENT DOCUMENTS

| | | |
|---|---|---|
| JP | 2007-200243 A | 8/2007 |
| JP | 2007-317190 A | 12/2007 |
| JP | 2009-31971 A | 2/2009 |
| JP | 2009059264 A | 3/2009 |
| JP | 2010-102671 A | 5/2010 |

OTHER PUBLICATIONS

Notice of Reasons for Rejection issued to JP Application No. 2009-246362, dated Apr. 2, 2013, 7 pages.
International Search Report issued for PCT/JP2010/066702, dated Oct. 26, 2010.

* cited by examiner

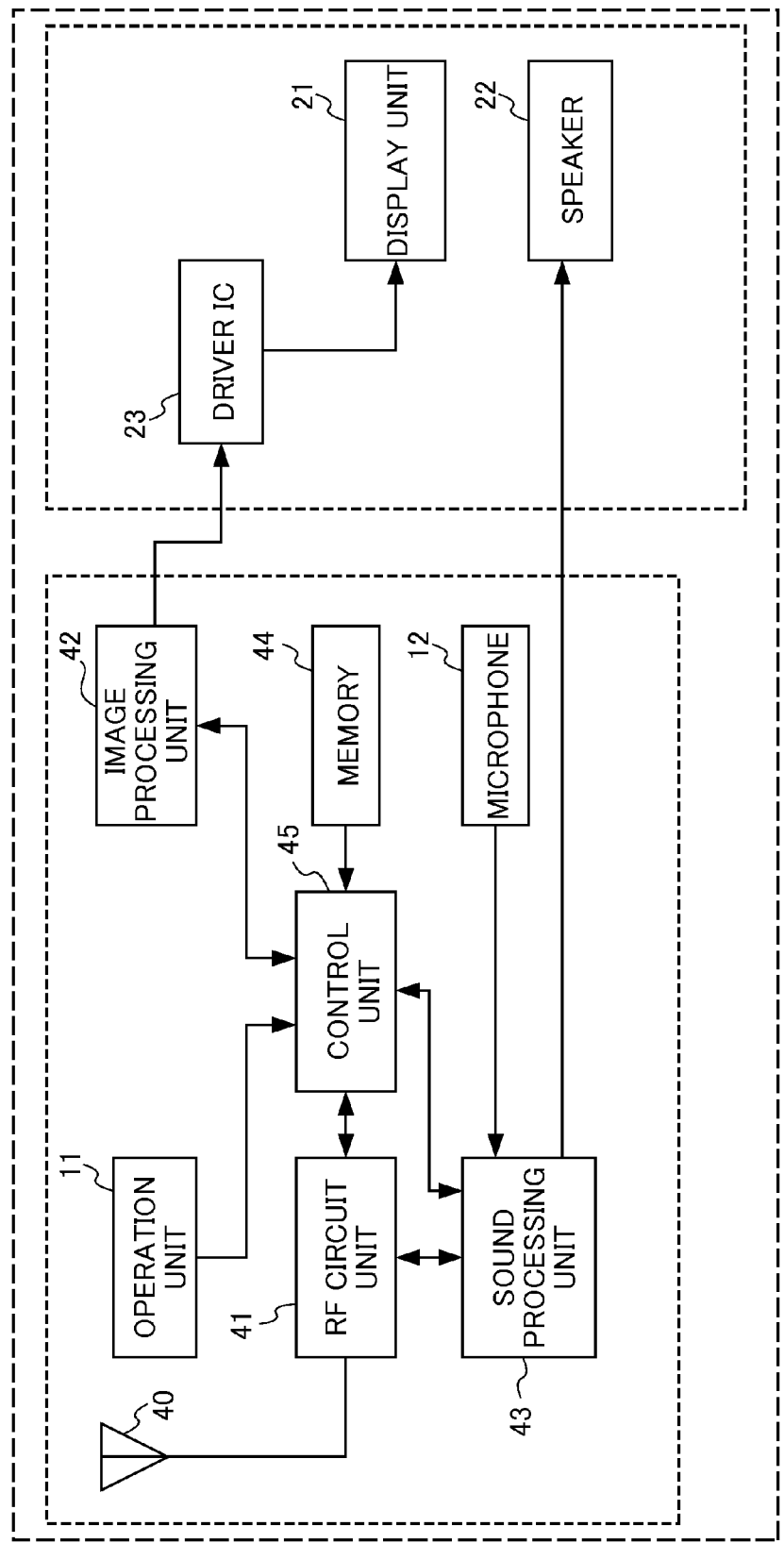

| POSITION INFORMATION OF KEY | KEY ASSIGNMENT |
|---|---|
| ⋮ | ⋮ |
| X2, Y1 | 1 |
| X2, Y2 | 2 |
| X2, Y3 | 3 |
| X3, Y1 | 4 |
| X3, Y2 | 5 |
| X3, Y3 | 6 |
| ⋮ | ⋮ |

| POSITION INFORMATION OF KEY | NUMBER OF TIMES CONSECUTIVELY DEPRESSED | KEY ASSIGNMENT |
|---|---|---|
| ⋮ | | ⋮ |
| X2, Y1 | 1 | あ |
| | 2 | い |
| | 3 | う |
| | 4 | え |
| | 5 | お |
| | | ⋮ |

| POSITION INFORMATION OF KEY | KEY ASSIGNMENT |
|---|---|
| ⋮ | ⋮ |
| X2, Y1 | 1ch |
| X2, Y2 | 2ch |
| X2, Y3 | 3ch |
| X3, Y1 | 4ch |
| X3, Y2 | 5ch |
| X3, Y3 | 6ch |
| ⋮ | ⋮ |

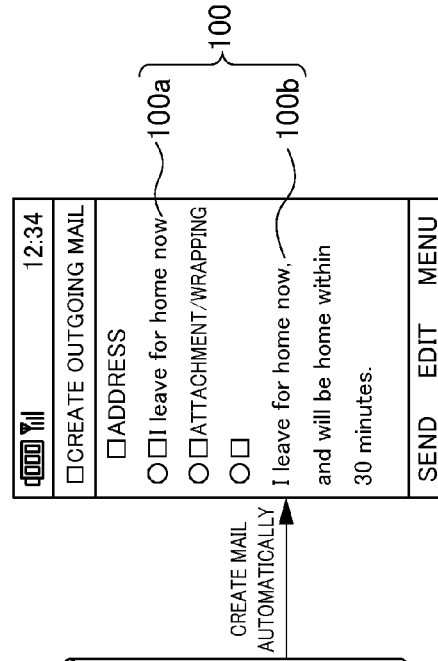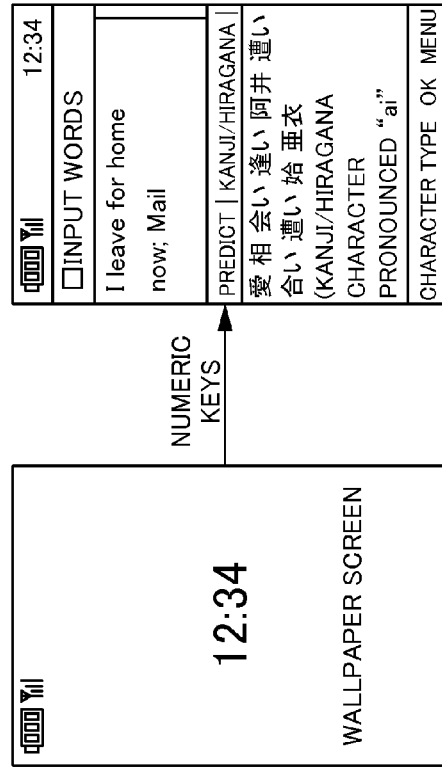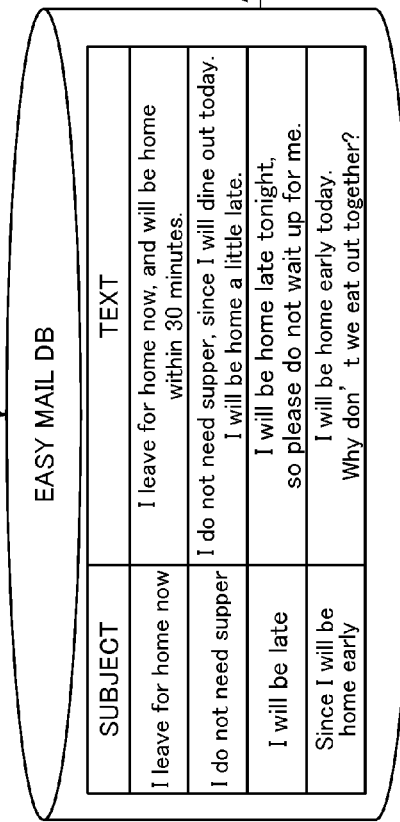

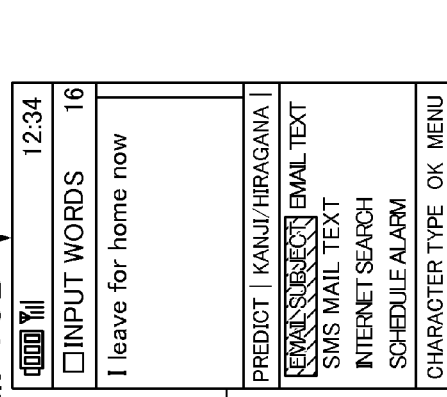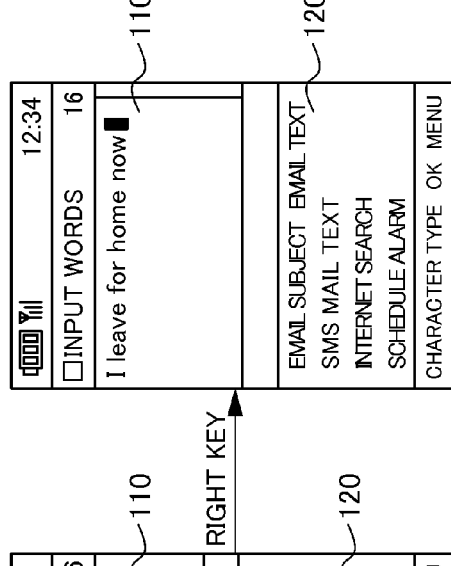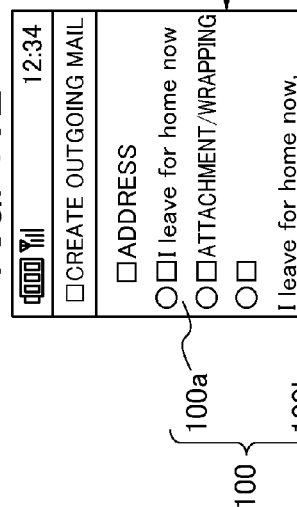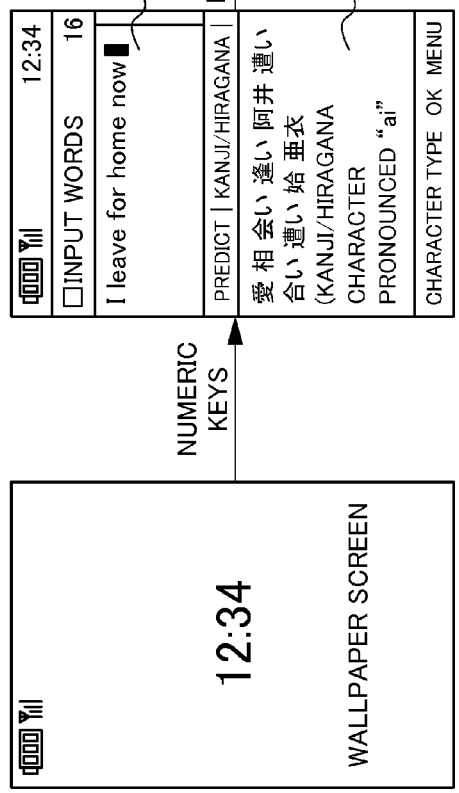

FIG. 12

EASY MAIL DB

| SUBJECT | TEXT |
|---|---|
| I leave for home now | I leave for home now, and will be home within 30 minutes. |
| I do not need supper | I do not need supper, since I will dine out today. I will be home a little late. |
| I will be late | I will be home late tonight, so please do not wait up for me. |
| Since I will be home early | I will be home early today. Why don't we eat out together? |

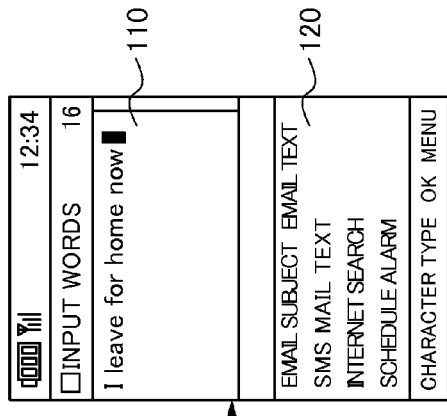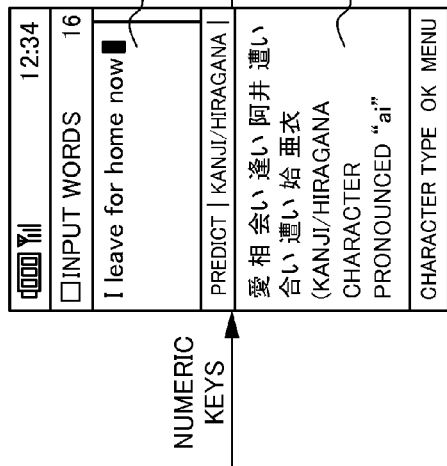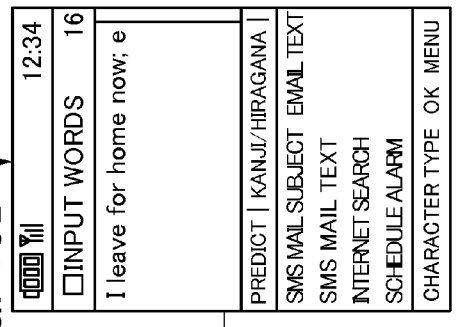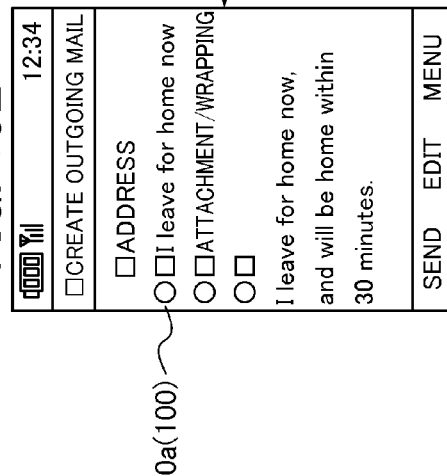

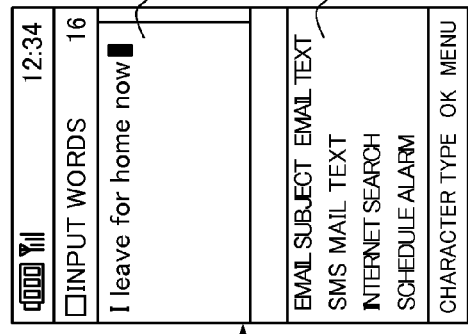
FIG. 14A
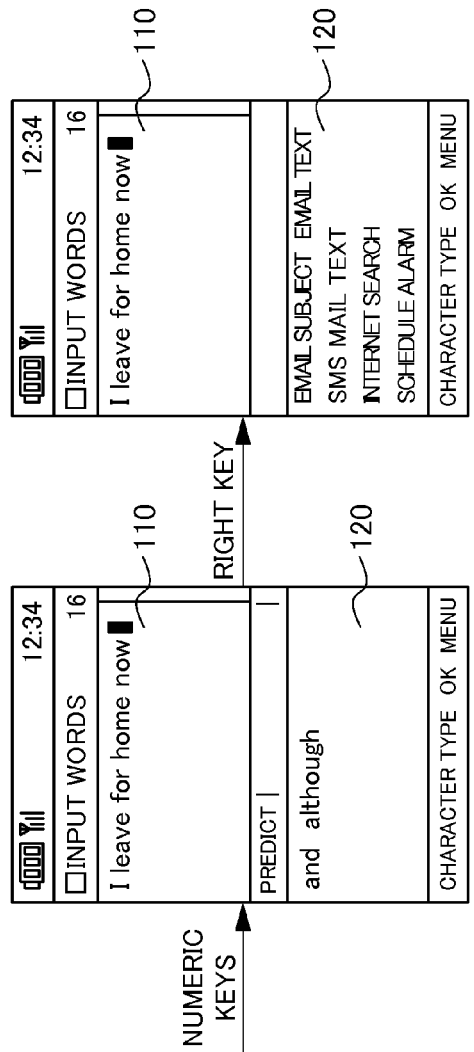
FIG. 14B
FIG. 14C
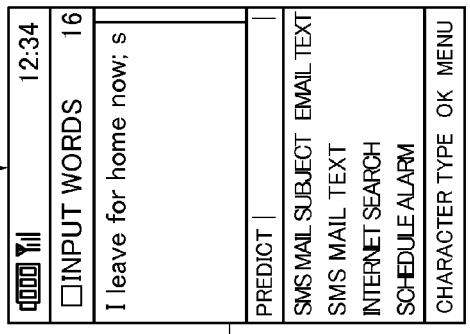
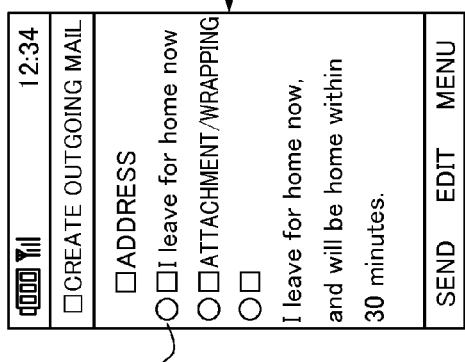
FIG. 14D
FIG. 14E

FIG. 16

| EXAMPLE | MEMO PAD | EMAIL SUBJECT | EMAIL TEXT | SEARCH | KANJI PROOFREAD | SCHEDULE | DICTIONARY |
|---|---|---|---|---|---|---|---|
| WORD ONLY | – | 4 | – | 1 | 2 | – | 3 |
| SINGLE SENTENCE | 1 | 3 | 7 | 2 | 5 | 4 | 6 |
| LINE FEED INCLUDED | 2 | – | 1 | – | – | 3 | – |
| TIME (NUMERIC CHARACTER) INCLUDED | 2 | 5 | 3 | 4 | – | 1 | – |
| SPACE MARK INCLUDED | 3 | – | 2 | 1 | – | 3 | – |
| AT LEAST TWO PERIODS INCLUDED | 2 | – | 1 | – | – | 3 | – |

ELECTRONIC DEVICE AND METHOD FOR ACTIVATING APPLICATION

CROSS-REFERENCE TO RELATED APPLICATIONS

This application is a Continuation-in-Part of U.S. application Ser. No. 13/498,406, filed Mar. 27, 2012, and a National Stage of International Application No. PCT/JP2010/066702, filed Sep. 27, 2010, which claims the benefit of Japanese Application Nos. 2009-223527, filed Sep. 28, 2009, and 2009-246362, filed Oct. 27, 2009, the entire contents of all of which are incorporated by reference herein.

FIELD OF THE INVENTION

The present invention relates to an electronic device including an application that can input characters, and to a method for activating the application.

BACKGROUND OF THE INVENTION

Some electronic devices such as cellular telephone devices include: an operation unit that inputs characters; a display unit that displays characters that are input by the operation unit; and a control unit, in which, when a desired application having a character input screen is selected in a state where input characters are displayed, the control unit displays the input characters on the character input screen of the application thus selected (see Patent Document 1).

Patent Document 1: Japanese Unexamined Patent Application, Publication No. 2009-31971

SUMMARY OF THE INVENTION

Problems to be Solved by the Invention

However, in such electronic devices, it has been required to select a single application, which is desired by the user, from among a plurality of applications. Moreover, in such electronic devices, applications that can be selected by the user have been limited.

An object of the present invention is to provide an electronic device that can activate a desired application based on a character string or a character that is displayed, and a method for activating the application.

Means for Solving the Problems

An electronic device according to the present invention includes: an activation unit that activates an application that can input characters in a character input area; a storage unit that stores a predetermined character string that corresponds to the application; an operation unit that inputs a first character string including a single or a plurality of characters, and a second character string including a single or a plurality of characters; a display unit that displays the first character string and the second character string that are input by the operation unit; a determination unit that determines whether the second character string coincides with the predetermined character string; and a control unit, wherein, in a case in which the determination unit determines that the second character string coincides with the predetermined character string, the control unit activates an application corresponding to the predetermined character string by the activation unit, and inputs the first character string in the character input area of the application.

In addition, in the electronic device according to the present invention, it is preferable for the operation unit to be able to input an inconvertible symbol that cannot be converted, and based on a fact that the inconvertible symbol is input after the first character string is input by the operation unit, it is preferable for the control unit to determine that the second character string will be input.

Furthermore, it is preferable for the first character string, which is input by the operation unit, to include a first input character string and a second input character string.

Moreover, in a case in which the determination unit determines that the second character string coincides with the predetermined character string, it is preferable for the control unit to display the first character string in a first mode, and to display the second character string in a second mode different from the first mode.

In addition, as an application corresponding to the predetermined character string, in a case in which the activation unit activates a search application that performs a search based on the first character string that is input in the character input area, it is preferable for the control unit to position a movable operation cursor, which is displayed on a screen corresponding to the search application, in an operation position for performing the search.

Furthermore, in a state where an initial screen is displayed on the display unit, in a case in which the first character string and the second character string are input by the operation unit, it is preferable for the determination unit to determine whether the second character string coincides with the predetermined character string.

The electronic device according to the present invention includes: an activation unit that activates an application that can input characters in a character input area; a storage unit that stores a predetermined character string that corresponds to the application; an operation unit that inputs a character string including a single or a plurality of characters; a display unit that displays an input character string, which is input by the operation unit, in a first display area, and displays the predetermined character string, which is stored in the storage unit, in a second display area; and a control unit, wherein, when the predetermined character string is selected by the operation unit, the control unit causes the activation unit to activate an application corresponding to the predetermined character string thus selected, and inputs the input character string in the character input area of the application.

Moreover, it is preferable for the operation unit to be able to input an inconvertible symbol that cannot be converted, and based on a fact that the inconvertible symbol is input after the input character string is input by the operation unit, it is preferable for the control unit to display the predetermined character string in the second display area.

In addition, it is preferable for a plurality of the input character strings to include a first input character string and a second input character string.

Furthermore, as an application corresponding to the predetermined character string, in a case in which the activation unit activates a search application that performs a search based on the input character string that is input in the first display area, it is preferable for the control unit to display a movable operation cursor, which is displayed on a screen corresponding to the search application, in a predetermined position on the display unit.

Moreover, it is preferable for the storage unit to store the input character string that is input by the operation unit and the application that is activated by the activation unit when inputting the input character string, in association with each other, and in a case in which an input character string is input by the operation unit, it is preferable for the control unit to display the predetermined character string, which corresponds to the application stored in the storage unit in association with the input character string, in the second display area.

In addition, the electronic device according to the present invention further includes an analysis unit that analyzes the input character string that is input by the operation unit, and it is preferable for the control unit to change display order of the predetermined character strings displayed in the second display area, based on a result of an analysis by the analysis unit.

Furthermore, it is preferable for the storage unit to store an activation number of times the activation unit activates each application, and based on the activation number of times of each application, which is stored in the storage unit, it is preferable for the control unit to display the predetermined character strings in descending order of the activation number of times, in the second display area.

Moreover, it is preferable for the predetermined character strings and conversion candidate characters, which are converted from the input character string displayed in the first display area, to be displayed in the second display area, and it is preferable for the predetermined character strings and the conversion candidate characters to be displayed in different modes.

In addition, in a state where an initial screen is displayed on the display unit, in a case in which the input character string is input by the operation unit, it is preferable for the control unit to display the predetermined character string in the second display area.

Furthermore, a method for activating an application according to the present invention includes the steps of: storing a predetermined character string that corresponds to an application that can input characters in a character input area; displaying a first character string on a display unit, in accordance with an input of the first character string including a single or a plurality of characters; displaying the predetermined character string in association with the first character string that is displayed; and activating the application corresponding to the predetermined character string, and inputting the first character string in the character input area of the application.

Moreover, the method for activating an application according to the present invention preferably includes the steps of: displaying, together with the first character string, a second character string that is input; determining whether the second character string thus displayed coincides with the predetermined character string that is stored; and in a case in which the second character string is determined to coincide with the predetermined character string, activating the application corresponding to the predetermined character string, and inputting the first character string in the character input area of the application.

In addition, the method for activating an application according to the present invention preferably includes the steps of: displaying the first character string, which is input, as an input character string in a first display area of the display unit, and displaying the predetermined character string, which is stored, in a second display area of the display unit; and when the predetermined character string displayed in the second display area is selected, activating an application corresponding to the predetermined character string thus selected, and inputting the input character string in the character input area of the application.

Effects of the Invention

The present invention can activate a desired application, based on a displayed character string.

BRIEF DESCRIPTION OF THE DRAWINGS

FIG. 2 is a functional block diagram showing functions of the cellular telephone device;

FIG. 5 is a diagram showing an example of how a display mode changes when a mail application is activated by inputting a first character string and a second character string in a state where a wallpaper screen is displayed on a display unit, and an example of a conversion database;

FIG. 10 is a sequence of views showing how a display mode changes when character strings are input in a state where a wallpaper screen is displayed on a display unit;

FIG. 12 is a diagram showing a conversion database;

FIG. 13 is a sequence of views showing how the display mode changes when character strings are input in a state where the wallpaper screen is displayed on the display unit, and a new character is input thereafter;

FIG. 14 is a sequence of views showing how the display mode changes when character strings are input in a state where the wallpaper screen is displayed on the display unit, and a new character is input thereafter;

FIG. 16 is a table for determining display order of predetermined character strings.

Figure 1:
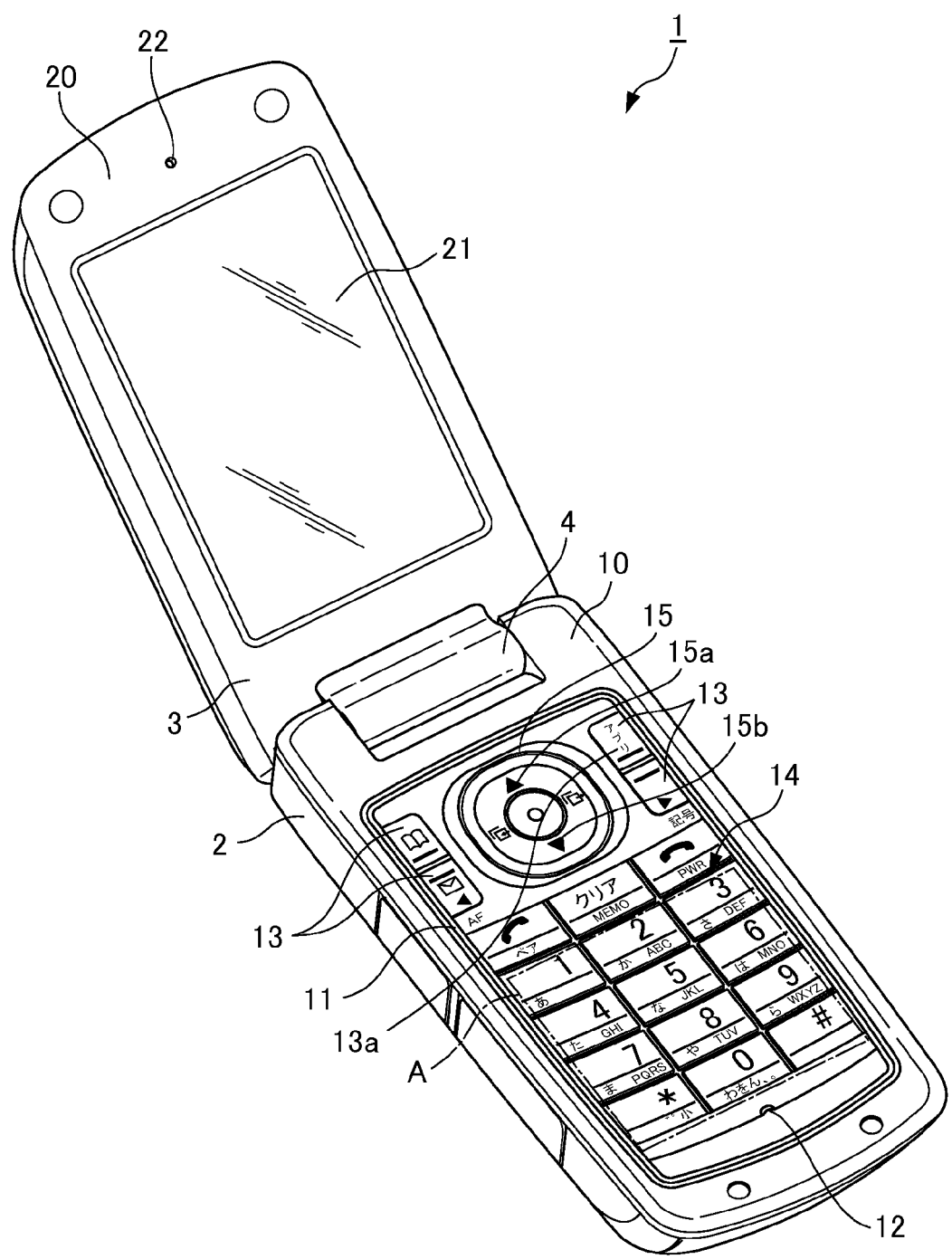
FIG. 1 is a perspective view showing an appearance of a cellular telephone device according to an embodiment of an electronic device of the present invention.

EXPLANATION OF REFERENCE NUMERALS 1 cellular telephone device (electronic device)
11 operation unit
21 display unit
44 memory (storage unit)
45 control unit
45a activation unit
45b determination unit 45c analysis unit
100 character input area

DETAILED DESCRIPTION OF THE INVENTION

First Embodiment

Descriptions are provided hereinafter regarding embodiments of the present invention. First of all, a first embodiment is described. FIG. 1 is a perspective view showing an appearance of a cellular telephone device 1 according to an embodiment of an electronic device of the present invention. It should be noted that, although FIG. 1 shows what is called a folding-type cellular telephone device, the cellular telephone device according to the present invention is not particularly limited thereto. For example, the type of the cellular telephone device may be a slider type in which one of the bodies slides to one direction in a state in which the bodies are mutually superimposed; a rotating (turning) type in which one of the bodies is rotated around an axis line along the direction of superimposing the bodies; and a type (straight type or flip type) in which an operation unit and a display unit are disposed in one body without having a connecting portion.

The cellular telephone device 1 includes an operation unit side body 2 and a display unit side body 3. The operation unit side body 2 includes, on a front face portion 10 thereof, an operation unit 11 and a microphone 12 to which sound produced by a user of the cellular telephone device 1 during a phone call is input. The operation unit 11 is configured with: function setting operation keys 13 for operating various functions such as for various settings, a telephone number directory function and a mail function; input operation keys 14 for inputting the digits of a telephone number and characters for mail, etc.; and a selection operation key 15 for performing selection of the various operations, scrolling, etc.

Moreover, the display unit side body 3 includes, on a front face portion 20, the display unit 21 for displaying a variety of information, and a speaker 22 for outputting sound of the other party during a telephone call.

In addition, an upper end portion of the operation unit side body 2 and a lower end portion of the display unit side body 3 are connected via a hinge mechanism 4. Furthermore, the cellular telephone device 1 can be in a state where the operation unit side body 2 and the display unit side body 3 are apart from each other (opened state), and in a state where the operation unit side body 2 and the display unit side body 3 are contacting each other (folded state), as the operation unit side body 2 and the display unit side body 3, connected via the hinge mechanism 4, pivot with respect to each other.

Moreover, FIG. 2 is a functional block diagram showing functions of the cellular telephone device 1. As shown in FIG. 2, in the cellular telephone device 1, the operation unit side body 2 or the display unit side body 3 includes the operation unit 11, the microphone 12, a main antenna 40, an RF circuit unit 41, an image processing unit 42, a sound processing unit 43, memory 44 (a storage unit), a control unit 45, the display unit 21, the speaker 22 and a driver IC 23.

The main antenna 40 is configured to communicate with external devices such as base stations via a predetermined usable frequency band (for example, 800 MHz band). It should be noted that, although 800 MHz is set as the predetermined usable frequency band in the present embodiment, other frequency bands can also be used.

The RF circuit unit 41 executes demodulation processing of a signal received via the main antenna 40, and transmits the processed signal to the control unit 45. In addition, the RF circuit unit 41 executes modulation processing of the signal transmitted from the control unit 45, and transmits the signal to external devices via the main antenna 40. Furthermore, on the other hand, the RF circuit unit 41 notifies the control unit 45 of the intensity of a signal received via the main antenna 40.

The image processing unit 42 executes predetermined image processing, and outputs the processed image data to the driver IC 23, according to control by the control unit 45. When the image data is transmitted from the image processing unit 42, the driver IC 23 stores the image data in frame memory, and outputs the image data on the display unit 21 at predetermined timing.

The sound processing unit 43 executes predetermined sound processing in accordance with control by the control unit 45 for a signal transmitted from the RF circuit unit 41, and outputs the processed signal to the speaker 22. The speaker 22 externally outputs the signal that is transmitted from the sound processing unit 43.

Moreover, when a signal is input from the microphone 12, the sound processing unit 43 processes the signal, and outputs the processed signal to the RF circuit unit 41, according to control by the control unit 45. The RF circuit unit 41 executes predetermined processing on the signal transmitted from the sound processing unit 43, and outputs the processed signal to the main antenna 40.

The memory 44 includes, for example, working memory, and is utilized for arithmetic processing by the control unit 45. In addition, the memory 44 stores a plurality of applications as well as various tables and the like that are required by the applications. Furthermore, the memory 44 may also serve as detachable external memory.

The control unit 45 controls the entirety of the cellular telephone device 1, and is configured to employ a central processing unit (CPU) and the like. Here, descriptions are provided for control operations of the control unit 45 depending on key operations via the operation unit 11. The control unit 45 changes the characters and functions to be assigned to each key (the function setting operation keys 13, the input operation keys 14 and the selection key 15) configuring the operation unit 11, essentially in accordance with an application that is currently activated.

Figures 3A, 3B, 3C, 3D:
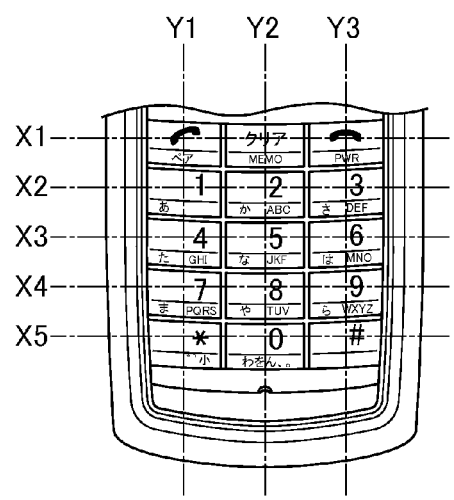
FIG. 3 is a diagram illustrating key assignment.

More specifically, when any key is depressed, the operation unit 11 transmits position information of the key (for example, as shown in FIG. 3A, in a case in which a key (a key with "1" and "a" printed on its surface) in the second line and the left row among the input operation keys 14 is depressed, position information (X2, Y1) is transmitted) to the control unit 45. The control unit 45 accesses the memory 44, refers to a key assignment table corresponding to an application that is currently activated, and executes processing of a character and a function assigned thereto, based on the position information that has been transmitted from the operation unit 11. For example, as shown in FIGS. 3B to 3D, the memory 44 stores a plurality of key assignment tables. It should be noted that FIG. 3B is a table that is utilized when an outgoing telephone call is made; FIG. 3C is a table that is utilized in a memo pad application and a mail application; and FIG. 3D is a table that is utilized when changing a channel in a television tuner application.

It should be noted that the executing of processing of a character means that, for example, in a case in which the currently activated application is a memo pad application, then "1" or "a" is displayed on the display unit 21. Moreover, the executing of processing of a function means that, for example, in a case in which the currently activated application is a television tuner, the display channel is set to channel 1.

In addition, the memory 44 stores a plurality of key assignment tables, and depending on the application, the control unit 45 switches a key assignment table to be referred to, refers to a predetermined key assignment table based on position information of a key that has been transmitted from the operation unit 11, and performs predetermined processing.

The cellular telephone device 1 with such a configuration has a function capable of activating a desirable application, based on a displayed character string.

Figure 4:
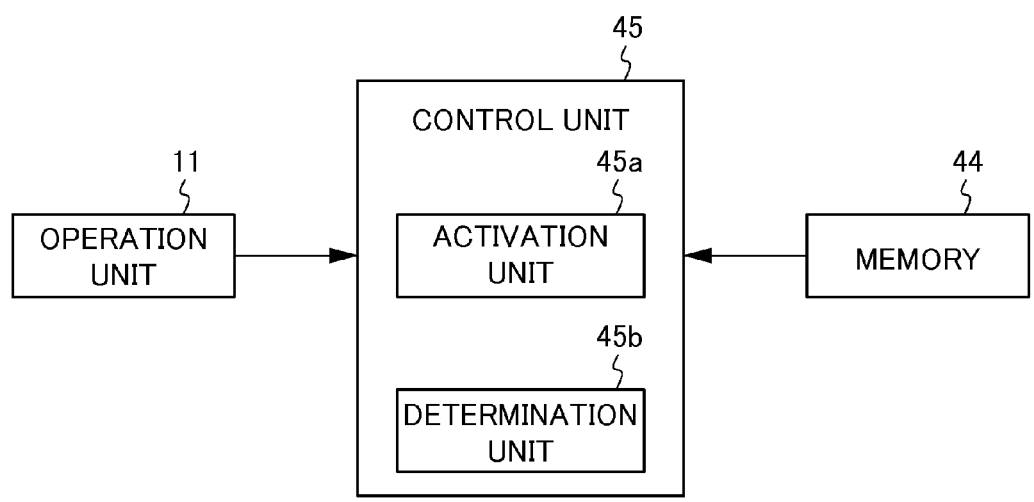
FIG. 4 is a functional block diagram showing a configuration for a cellular telephone device according to a first embodiment to achieve a function.

Descriptions are hereinafter provided for a configuration and operations for achieving the aforementioned function according to the cellular telephone device 1. First of all, with reference to FIG. 4, descriptions are provided for the configuration for achieving the aforementioned function of the cellular telephone device 1 according to the first embodiment. FIG. 4 is a functional block diagram showing the configuration for the cellular telephone device 1 to achieve the aforementioned function.

The cellular telephone device 1 includes an activation unit 45*a*, the memory 44, the operation unit 11, the display unit 21 (see FIG. 2), a determination unit 45*b*, and the control unit 45.

The activation unit 45*a* activates an application that can input characters in a character input area 100. Examples of such an application include, for example, a mail application, an internet browser application, a dictionary lookup application, a memo pad application, a television tuner application, an address book application, a schedule book application, and the like. Furthermore, the character input area 100 is an area in which characters are input. For example, in a case of the mail application, the character input area 100 is composed of an area in which a mail subject is input (a subject input area 100*a*; see FIG. 5D), and an area in which mail text is input (a text input area 100*b*; see FIG. 5D).

The memory 44 stores a predetermined character string that corresponds to an application that can input characters. The predetermined character string is a character string, with which an application can be specified. The predetermined character string may be, for example, a name, an abbreviation or the like of the application.

As a more specific example, the predetermined character string is "mail" in a case of the mail application. Moreover, in a case in which train transfer information or the like is searched for by utilizing the internet browser application, the predetermined character string is "transfer information". Furthermore, in a case in which a predetermined word/ phrase is searched for by utilizing the internet browser application, the predetermined character string is "search".

The operation unit 11 inputs a first character string including a single or a plurality of characters, and a second character string including a single or a plurality of characters.

The first character string is a character string that is input in the character input area 100 of an application as a result of processing of the control unit 45, which will be described later. The first character string is composed of a single or a plurality of non-numeric characters, a single or a plurality of numeric characters, a combination of non-numeric characters and numeric characters, or the like.

The second character string is an input character string that is input for the activation unit 45*a* to activate an application that is desired by the user. The second character string is a character string identical to a predetermined character string corresponding to an application that is activated by the activation unit 45*a*. For example, in a case in which the mail application of which predetermined character string is "mail" is activated, "mail" is input as the second character string. It should be noted that the second character string is composed of a single or a plurality of non-numeric characters, a single or a plurality of numeric characters, a combination of non-numeric characters and numeric characters, or the like.

The display unit 21 displays the first character string and the second character string that are input by the operation unit 11.

The determination unit 45*b* determines whether the second character string displayed on the display unit 21 coincides with a predetermined character string stored in the memory 44. For example, in a case in which "mail" (corresponding to the mail application), "television" (corresponding to the television tuner application) and the like are stored as predetermined character strings in the memory 44, when "mail" is displayed on the display unit 21 (when "mail" is input by the operation unit 11) as the second character string, the determination unit 45*b* determines whether "mail" as the second character string coincides with any character string among a plurality of predetermined character strings.

In a case in which the determination unit 45*b* determines that the second character string coincides with a predetermined character string, the control unit 45 activates an application corresponding to the predetermined character string by the activation unit 45*a*, and inputs the first character string in the character input area 100 of the application. For example, in a case in which the determination unit 45*b* determines that "mail" as the second character string coincides with "mail" as the predetermined character string, the control unit 45 activates the mail application, and inputs the first character string in the subject input area 100*a* (see FIG. 5D) or the text input area 100*b* (see FIG. 5D) of the mail application.

Therefore, in a case in which the determination unit 45*b* determines that the second character string that is input by the operation unit 11 coincides with the predetermined character string stored in the memory 44, the cellular telephone device 1 activates an application corresponding to the predetermined character string; accordingly, a desired application can be activated, based on a character string displayed on the display unit 21.

Moreover, the operation unit 11 can input an inconvertible symbol that cannot be converted.

Based on a fact that an inconvertible symbol is input after the first character string is input by the operation unit 11, the control unit 45 can determine that the second character string will be input thereafter. In other words, in a case in which an inconvertible symbol is input, the control unit 45 determines that a character string to be input after the inconvertible symbol will be the second character string. The inconvertible symbol that cannot be converted is, for example, a symbol such as a space mark, a pound sign (#) or an asterisk (*), which is defined so as not to be allowed to be converted into a hiragana character, a katakana character, a kanji character, a lower case character, an upper case character and the like.

Therefore, in a case in which an inconvertible symbol is input after a certain character string, the cellular telephone device 1 can determine that a character string to be input after the inconvertible symbol is the second character string.

It should be noted that, the first character string and the second character string may be input by the operation unit 11 at first, and after inputting those character strings, an inconvertible symbol may be input between the first character string and the second character string.

In addition, the first character string that is input by the operation unit 11 can include a first input character string and a second input character string. The first input character string and the second input character string are each composed of a character string such as a plurality of non-numeric and/or numeric characters or the like. The inputting of a plurality of character strings as the first character string is utilized, for example, in a case of searching for train transfer information by utilizing the internet browser application. More specifically, in a case in which the operation unit 11 inputs "Ichigao" (station) as the first input character string of the first character string, "Shinjuku" (station) as the second input character string of the first character string, and "transfer information" as the second character string, the cellular telephone device 1 is connected to a transfer information site to display transfer information for trains from Ichigao Station to Shinjuku Station on the display unit 21. It should be noted that, in a case of searching for transfer information, the control unit 45 may determine the first input character string, which is firstly input as the first character string, to be a departure station, and determine the second input character string, which is input after the first input character string, to be an arrival station.

Therefore, even in a case in which the first character string includes the first input character string and the second input character string, in a case in which the determination unit 45b determines that the second character string that is input by the operation unit 11 coincides with the predetermined character string stored in the memory 44, the cellular telephone device 1 activates an application corresponding to the predetermined character string; therefore, a desired application can be activated, based on a character string displayed on the display unit 21.

Furthermore, in a case in which the determination unit 45 determines that the second character string coincides with the predetermined character string, the control unit 45 can display the first character string in a first mode, and display the second character string in a second mode different from the first mode. In a case in which the first character string is displayed in the first mode, and the second character string is displayed in the second mode, the control unit 45 may, for example, display the first character string and the second character string in different colors on the display unit 21, or display the first character string and the second character string in different font styles on the display unit 21.

Accordingly, since the cellular telephone device 1 displays the first character string and the second character string in such different modes on the display unit 21, it is possible to show the user that the second character string coinciding with the predetermined character string has been input.

Moreover, as an application corresponding to a predetermined character string, in a case in which the activation unit 45a activates a search application that performs a search based on the first character string that is input in the character input area 100, the control unit 45 can position a movable operation cursor, which is displayed on a screen corresponding to the search application, in an operation position for performing the search.

The operation cursor is an entity, which moves in a screen of the display unit 21 as a result of operating the operation unit 11 (for example, the selection operation key 15; see FIG. 1), and which indicates a position for performing an operation in the screen.

In a case in which a predetermined word/phrase is searched for by activating the internet browser application, the operation position for performing a search is a position of a search button (an icon displayed on the display unit 21) for performing a search. In the case of this example, when the internet browser application is activated, the control unit 45 displays the search button and the operation cursor as being overlapped on the display unit 21; therefore, for example, in order to perform a search with a predetermined word/phrase, the search is performed by the user to only depress the selection operation key 15. In other words, the user does not have to move the operation cursor vertically so as to overlap the operation cursor with the search button by operating the operating selection operation key 15.

Therefore, the cellular telephone device 1 does not require the user to perform an operation to position the operation cursor in the operation position for performing a search (for example, the search button) on the display unit 21; accordingly, it is possible to save time and effort of the user's operations.

In addition, in a state where an initial screen (a wallpaper screen) is displayed on the display unit 21, in a case in which the first character string and the second character string are input by the operation unit 11, the determination unit 45b can determine whether the second character string coincides with a predetermined character string. The initial screen (wallpaper screen) is a screen displayed on the display unit 21 on standby for an incoming telephone call or incoming mail, and on standby for activation of an application.

Therefore, in a state where the initial screen is displayed on the display unit 21, in a case in which the determination unit 45b determines that the second character string that is input by the operation unit 11 coincides with a predetermined character string stored in the memory 44, the cellular telephone device 1 activates an application corresponding to the predetermined character string; accordingly, a desired application can be activated, based on a character string displayed on the display unit 21.

Figure 6:
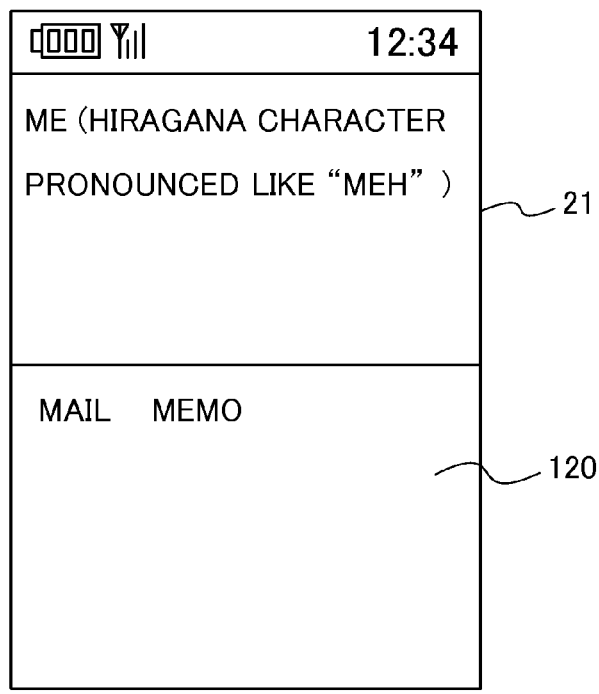
FIG. 6 is a view showing a first display mode of a display unit 21, for the purpose of illustrating conversion candidate characters.
Figure 7:
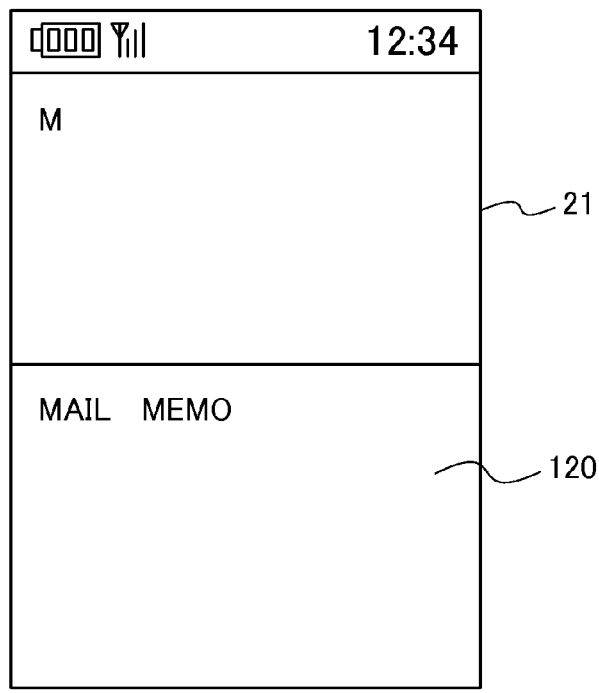
FIG. 7 is a view showing a second display mode of the display unit 21, for the purpose of illustrating conversion candidate characters.

Next, descriptions are provided for operations of the cellular telephone device 1 of the first embodiment. FIG. 5 is a diagram showing an example of how a display mode changes when the mail application is activated by inputting the first character string and the second character string in a state where the wallpaper screen is displayed on the display unit 21, and an example of a conversion database. FIG. 6 is a view showing a first display mode of the display unit 21 for illustrating conversion candidate characters. FIG. 7 is a view showing a second display mode of the display unit 21 for illustrating conversion candidate characters.

First of all, in state where the wallpaper screen is displayed on the display unit 21 (see FIG. 5A), by operating the operation unit 11 (numeric keys), in a case in which "I leave for home now" is input as the first character string, "mail" is input as the second character string, and a space mark is input as the inconvertible symbol between the first character string and the second character string, the control unit 45 controls the display unit 21 to display "I leave for home now. Mail." (see FIG. 5B).

Here, as shown in FIG. 6, for example, by operating the operation unit 11 to input a katakana character string "mail", in a case in which, a hiragana character "me" is input at first, and the hiragana character "me" is displayed on the display unit 21, the display unit 21 can display hiragana/katakana words (for example, "mail", "memo", etc. with an initial Japanese character pronounced like "meh"), as conversion candidate character strings in a conversion candidate display area 120. In a case in which any one of the words displayed in the conversion candidate display area 120 is selected, the character displayed on the display unit 21 is replaced with the word thus selected. For example, in a case in which "mail" is selected from among the plurality of conversion candidate characters "mail" and "memo" displayed in the conversion candidate display area 120, the hiragana character "me" displayed on the display unit 21 is replaced with the character string "mail".

Furthermore, as shown in FIG. 7, for example, by operating the operation unit 11 in order to input an English character string "MAIL", in a case in which an alphabetic character "M" is input, and the alphabetic character "M" is displayed on the display unit 21, English words (for example, "MAIL", "MEMO" and the like that are conversion candidate character strings with an initial alphabetic character "M") are displayed in the conversion candidate display area 120. In a case in which any one of the conversion candidate character strings displayed in the conversion candidate display area 120 is selected (for example, in a case in which "MAIL" is selected), the alphabetic character "M" displayed on the display unit 21 is replaced with "MAIL".

In addition, by operating the operation unit 11, for example, in a case in which "I leave for home now" is input as the first character string and is displayed on the display unit 21, and the alphabetic character "M" is firstly input as the second character string, conversion candidate characters (for example, "MAIL" and "MEMO") for the second character string are displayed in the conversion candidate character area. In a case in which, for example, "MAIL" is selected from among these conversion candidate characters, the alphabetic character "M" displayed on the display unit 21 is replaced with "MAIL".

When an inconvertible symbol is input, the control unit 45 determines that the second character string will be input after the inconvertible symbol. Furthermore, when a character string "OK" (an electronically displayed icon) that is displayed on the display unit 21 is selected by the operation unit 11, the determination unit 45b determines whether a predetermined character string stored in the memory 44 coincides with the second character string that is input by the operation unit 11. In a case in which the determination unit 45b determines that the predetermined character string coincides with the second character string, the control unit 45 causes the activation unit 45a to activate an application corresponding to the predetermined character string. As an example, as shown in FIG. 5, in a case in which "mail" as a predetermined character string and the mail application are stored in association with each other in the memory 44, when the determination unit 45b determines that the predetermined character string "mail" coincides with the second character string "mail", the control unit 45 activates the mail application.

The memory 44 stores a conversion database (EASY MAIL DB) that associates boilerplate phrases as mail subjects (mail subject boilerplate phrases) with boilerplate phrases as mail text (mail text boilerplate phrases), which are used when the mail application is activated (see FIG. 5C). As an example, the memory 44 stores the conversion database that associates a mail subject boilerplate phrase "I leave for home now" and a mail text boilerplate phrase "I leave for home now, and will be home within 30 minutes".

In addition, in a case in which "mail" is input as the second character string, the control unit 45 refers to the conversion database stored in the memory 44, and determines whether the conversion database includes a mail subject boilerplate phrase that coincides with the first character string. In a case in which the control unit 45 determines that conversion database includes a mail subject boilerplate phrase that coincides with the first character string, the control unit 45 reads a mail text boilerplate phrase that is associated with the mail subject boilerplate phrase, from the conversion database stored in the memory 44. Furthermore, the control unit 45 inputs the first character string in the subject input area 100a of the mail application activated by the activation unit 45a, and inputs the mail text boilerplate phrase, which is read from the conversion database, in the text input area 100b of the mail application (see FIG. 5D). As an example, as shown in FIG. 5, in a case in which "I leave for home now" is input as the first character string by the operation unit 11, the control unit 45 inputs "I leave for home now" in the subject input area 100a displayed on the display unit 21, and reads the mail text boilerplate phrase "I leave for home now, and will be home within 30 minutes" that is associated with the mail subject boilerplate phrase "I leave for home now" from the conversion database, and inputs the mail text boilerplate phrase in the text input area 100b displayed on the display unit 21.

It should be noted that, even if the second character string does not completely coincide with the mail subject boilerplate phrase in the conversion database, for example, in a case in which a morphological analysis of the second character string is performed, and based on a result of the analysis, the meaning of the second character string can be determined to coincide with the meaning of the mail subject boilerplate phrase, the control unit 45 may read, from the conversion database, a mail text boilerplate phrase that is associated with the mail subject boilerplate phrase, of which meaning has been determined to coincide with the meaning of the second character string.

Figure 8:
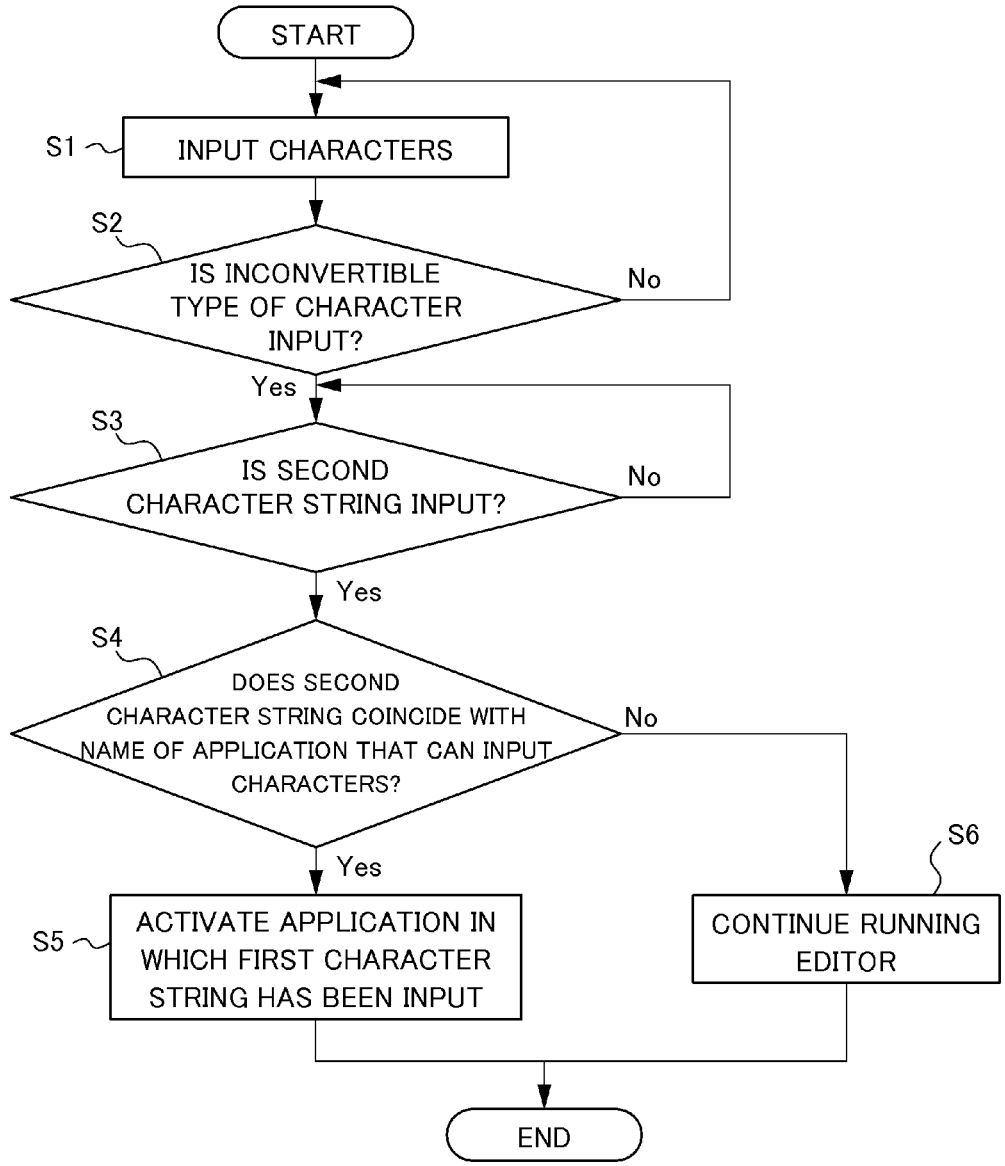
FIG. 8 is a flow chart showing operations of the cellular telephone device according to the first embodiment.

Next, descriptions are provided for operations of the cellular telephone device 1 of the first embodiment with reference to FIG. 8. FIG. 8 is a flow chart showing operations of the cellular telephone device 1.

First of all, in Step S1, the operation unit 11 inputs characters. In other words, as such input characters, the operation unit 11 inputs only the first character string, or inputs the first character string and an inconvertible symbol.

In Step S2, the control unit 45 determines whether an inconvertible type of character (an inconvertible symbol), which cannot be converted into another character, was input in the processing of Step S1. In a case in which the inconvertible symbol was not input (No), the processing returns to Step S1. In a case in which the inconvertible symbol was input (Yes), the processing advances to Step S3.

In Step S3, the control unit 45 determines whether the second character string was input after the inconvertible symbol by the operation unit 11. In a case in which the second character string was not input (No), the determination in Step S3 is repeated. In a case in which the second character string was input (Yes), the processing advances to Step S4.

In Step S4, the determination unit 45b determines whether the second character string coincides with a name or the like of an application that can input characters. In other words, the determination unit 45b determines whether the second character string coincides with a predetermined character string stored in the memory 44. In a case in which the second character string is determined to coincide with the predetermined character string (Yes), the processing advances to Step S5. In a case in which the second character string is determined not to coincide with the predetermined character string (No), the processing advances to Step S6.

In Step S5, the control unit 45 activates the application, for which the first character string has been input. In other words, the control unit 45 activates the application corresponding to the predetermined character string that has been determined to coincide with the second character string in the processing of Step S4, and inputs the first character string, which has been input by the processing of Step S1, in the character input area 100 of the application to be displayed the display unit 21.

In Step S6, the control unit 45 continues running an editor for inputting characters.

Moreover, in a case in which an inconvertible symbol is input while continuing running the editor, the processing returns to Step S3, in which the control unit 45 determines whether the second character string was input after the inconvertible symbol by the operation unit 11.

In the aforementioned first embodiment, with reference to FIG. 5, the descriptions have been provided for the case in which the mail application is activated. In the present invention, the application that is activated based on the second character string may be, for example, a dictionary lookup application, a memo pad application, a television tuner application, an address book application, a schedule book application and the like.

In a case in which the dictionary lookup application is activated by the activation unit 45*a*, the operation unit 11 inputs a search word/phrase as the first character string, and inputs "dictionary" as the second character string. In a case in which "dictionary" as a predetermined character string corresponding to the dictionary lookup application is stored in the memory 44, the determination unit 45*b* determines that "dictionary" as the second character string coincides with "dictionary" as the predetermined character string. As a result, the control unit 45 activates the dictionary lookup application by the activation unit 45*a*, and further inputs a search word/phrase (the first character string) in a search word/phrase input area (the character input area 100) of the dictionary lookup application.

In addition, in a case in which the memo pad application is activated by the activation unit 45*a*, for example, the operation unit 11 inputs "a phone call at five" as the first character string, and inputs "memo" as the second character string. In a case in which "memo" as a predetermined character string corresponding to the memo pad application is stored in the memory 44, the determination unit 45*b* determines that the second character string coincides with the predetermined character string. As a result, the control unit 45 activates the memo pad application by the activation unit 45*a*, and further inputs "a phone call at five" (the first character string) in a memo input area (the character input area 100) of the memo pad application.

Furthermore, in a case in which the television tuner application is activated by the activation unit 45*a*, for example, the operation unit 11 inputs "6" as the first character string, and inputs "television" as the second character string. In a case in which "television" as a predetermined character string corresponding to the television tuner application is stored in the memory 44, the determination unit 45*b* determines that the second character string coincides with the predetermined character string. As a result, the control unit 45 activates the television tuner application, inputs "6" (the first character string) in a viewing channel input area (the character input area 100), and displays a program of a channel 6 on the display unit 21.

Second Embodiment

Next, a second embodiment is described. A cellular telephone device 1 according to the second embodiment has a function capable of activating a desirable application, based on displayed characters.

Figure 9:
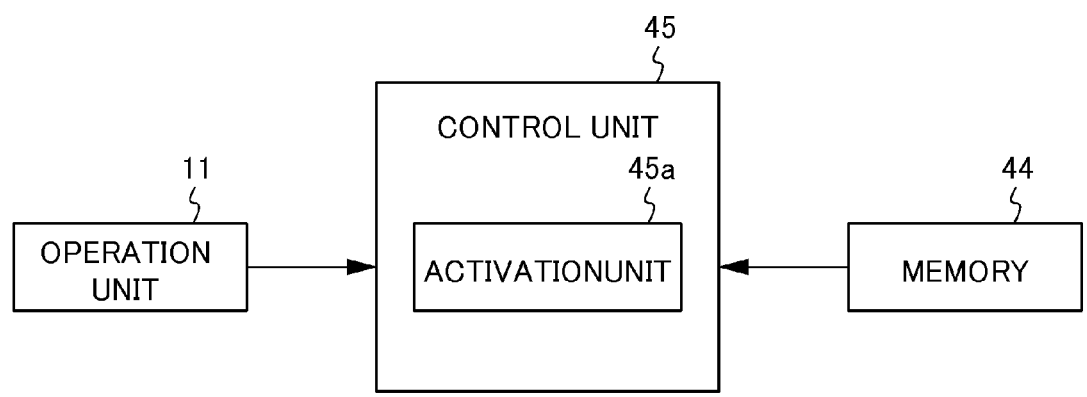
FIG. 9 is a functional block diagram showing the configuration for a cellular telephone device according to a second embodiment to achieve a function.

With reference to FIG. 9, descriptions are hereinafter provided for a configuration for achieving the aforementioned function of the cellular telephone device 1 according to the second embodiment. FIG. 9 is a functional block diagram showing the configuration for the cellular telephone device 1 to achieve the aforementioned function.

In order to achieve the function capable of activating a desirable application based on displayed characters, the cellular telephone device 1 includes an activation unit 45*a*, memory 44, operation unit 11, a display unit 21 and a control unit 45.

The activation unit 45*a* activates an application that can input characters in a character input area 100. Examples of such an application include, for example, a mail application, an internet browser application, a dictionary lookup application, a memo pad application, a television tuner application, an address book application, a schedule book application and the like. For example, in a case of the mail application, the character input area 100 is composed of an area in which a mail subject is input (a subject input area 100*a*; see FIG. 10(*e*)), and an area in which mail text is input (a text input area 100*b*; see FIG. 10(*e*)).

The memory 44 stores a predetermined character string that corresponds to an application. The predetermined character string is a character string for executing an application, based on characters, which will be described later. The predetermined character string is, for example, "email subject", "email text", "internet search", "schedule alarm" or the like.

The operation unit 11 is used for inputting a character string that includes a single or a plurality of characters. Such a character string includes numeric characters or the like as well, and is composed of a single or a plurality of non-numeric characters, a single or a plurality of numeric characters, or a combination of non-numeric characters and numeric characters.

The display unit 21 displays an input character string, which is input by the operation unit 11, in a first display area (hereinafter referred to as "input character display area") 110, and displays a predetermined character string, which is stored in the memory 44, in a second display area (hereinafter referred to as "conversion candidate display area") 120. The input character display area 110 is an area in which an input character string that is input by the operation unit 11 is displayed. The conversion candidate display area 120 is disposed, for example, below the input character display area 110, and displays a single or a plurality of predetermined character strings.

When a predetermined character string that is displayed in the conversion candidate display area 120 is selected by the operation unit 11, the control unit 45 activates an application corresponding to the selected predetermined character string by the activation unit 45*a*, and inputs the input character string in the character input area 100 of the application.

Therefore, in the cellular telephone device 1, by the operation unit 11 selecting a predetermined character string displayed in the conversion candidate display area 120, an application corresponding to the selected predetermined character string is activated; accordingly, a desired application can be activated, based on the displayed input character string.

Moreover, the operation unit 11 can input an inconvertible symbol that cannot be converted. The inconvertible symbol refers to, for example, a symbol such as a space mark, a pound sign (#) or an asterisk (*), which is defined so as not to be allowed to be converted into a hiragana character, a katakana character, a kanji character, a lower case character, an upper case character and the like.

Based on a fact that an inconvertible symbol is input after inputting input characters by the operation unit 11, the control unit 45 displays a predetermined character string in the conversion candidate display area 120. In other words, in a case in which the inconvertible symbol is input after inputting the characters by the operation unit 11, the control unit 45 displays the predetermined character string, which is stored in the memory 44, in the conversion candidate display area 120.

Therefore, based on the fact that the inconvertible symbol is displayed on the display unit 21 (i.e. the fact that the inconvertible symbol is input by the operation unit 11), the cellular telephone device 1 can display the predetermined character string in the conversion candidate display area 120.

Moreover, a plurality of input character strings include a first character string and a second character string. The first character string and the second character string are each composed of a plurality of non-numeric and/or numeric characters or the like.

Inputting the first character string and the second character string as the plurality of input character strings is utilized, for example, in a case of searching for transfer information for trains by utilizing the internet browser application. As a more specific example, in a case in which the operation unit 11 inputs "Ichigao" (station) as the first character string, and "Shinjuku" (station) as the second character string, and selects "transfer information" that is displayed in the conversion candidate display area 120, the cellular telephone device 1 is connected to a transfer information site to display transfer information for trains from Ichigao Station to Shinjuku Station on the display unit 21. It should be noted that, in a case of searching for transfer information, the control unit 45 may determine the first character string, which is input at first, to be a departure station, and determine the second character string, which is input after the first character string, to be an arrival station.

Therefore, in the cellular telephone device 1, even in a case in which the input character string includes the first character string and the second character string, by the operation unit 11 selecting a predetermined character string displayed in the conversion candidate display area 120, an application corresponding to the selected predetermined character string is activated; accordingly, a desired application can be activated, based on the input character string displayed on the display unit 21.

In addition, as an application corresponding to a predetermined character string, in a case in which the activation unit 45a activates a search application that performs a search based on the character that is input in the input character display area 110, the control unit 45 can position a movable operation cursor, which is displayed on a screen corresponding to the search application, in a predetermined position for performing the search.

The operation cursor is an entity, which moves in a screen of the display unit 21 as a result of operating the operation unit 11 (for example, the selection operation key 15; see FIG. 1), and which indicates a position for performing an operation in the screen.

In a case in which a predetermined word/phrase is searched for by activating the internet browser application, the operation position for performing a search is a position of a search button (an icon displayed on the display unit 21) for performing a search. In the case of this example, the control unit 45 displays the search button and the operation cursor as being overlapped on the display unit 21; therefore, for example, in order to perform a search with a predetermined word/phrase, the search is performed by the user to only depress the selection operation key 15. In other words, the user does not have to move the operation cursor vertically to overlap the operation cursor and the search button by operating the operating selection operation key 15.

Therefore, the cellular telephone device 1 does not require the user to perform an operation to position the operation cursor in the position for performing a search (for example, the search button) on the display unit 21; accordingly, it is possible to save time and effort of the user's operations.

Furthermore, the input character string that has been input by the operation unit 11, and the application that has been activated by the activation unit 45a when inputting the input character string, are stored in association with each other in the memory 44. For example, in a case in which the mail application is activated by the activation unit 45a when the operation unit 11 inputs "I leave for home now" as an input character string, the memory 44 stores the input character string "I leave for home now" and the mail application in association with each other.

In a case in which the operation unit 11 inputs an input character string, the control unit 45 displays a predetermined character string, which corresponds to an application stored in the memory 44 in association with the input character string, in the conversion candidate display area 120. In other words, in a case in which the operation unit 11 inputs an input character string that is identical to an input character string stored in the memory 44, the control unit 45 displays a predetermined character string, which corresponds to an application stored in the memory 44 in association with the input character string, in the conversion candidate display area 120. For example, in a case in which the input character string "I leave for home now" and the mail application are stored in association with each other in the memory 44, when the operation unit 11 inputs the input character string "I leave for home now", the control unit 45 displays a predetermined character strings such as "email subject" corresponding to the mail application in the candidate display area 120.

Therefore, in order to activate a desired application, the cellular telephone device 1 can display a predetermined character string in the conversion candidate display area 120, based on an input character that is displayed on the display unit 21.

It should be noted that, even if the input character that is stored in the memory 44 does not completely coincide with the input character that is input by the operation unit 11, for example, in a case in which a morphological analysis of the input character is performed, and based on a result of the analysis, the meaning of the input character that is stored in the memory 44 can be determined to coincide with the meaning of the input character that is input by the operation unit 11, the control unit 45 displays the predetermined character string, which is associated with the input character stored in the memory 44, and of which meaning has been determined to coincide with the meaning of the input character that is input by the operation unit 11, in the conversion candidate display area 120.

Moreover, the conversion candidate display area 120 displays a predetermined character string as well as conversion candidate characters that are converted from the input characters displayed in the input character display area 110. The predetermined character string and the conversion candidate characters are displayed in different modes.

Figure 11:
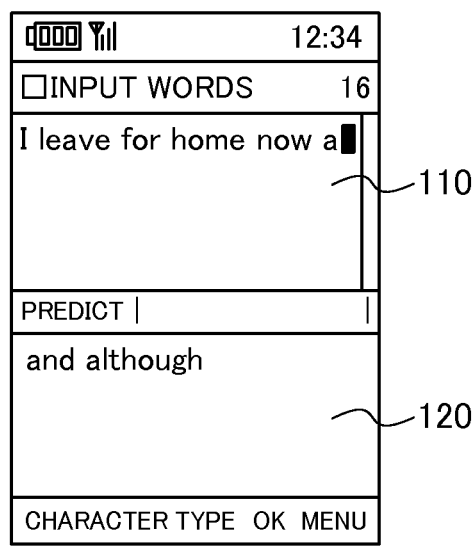
FIG. 11 is a view showing a third display mode of the display unit 21, for the purpose of illustrating conversion candidate characters.

The conversion candidate characters are characters that are displayed for the purpose of performing predictive conversion of characters that are input by the operation unit 11. For example, in a case in which a hiragana character string "a i" (with articulated pronunciation) is input by the operation unit 11, the conversion candidate characters are kanji/hiragana characters such as "ai (love)", "ai (mutuality)", "ai (to meet)", "ai (to encounter)" and "ai (person's name)". For example, in a case in which a alphabetic character "a" is input by the operation unit 11, the conversion candidate characters are characters such as "and" and "although" (see FIG. 11). It should be noted that, similarly to the case described above with reference to FIG. 7, by operating the operation unit 11 to input an alphabetic character "M", in a case in which the alphabetic character "M" is displayed in the input character display area 110, words with the initial character "M" (for example, "MAIL", "MEMO" and the like) are displayed in the conversion candidate display area 120. When the operation unit 11 is operated to select one conversion candidate character from among a single or a plurality of conversion candidate characters displayed in the conversion candidate display area 120, the input character that is displayed in the input character display area 110 is replaced with the conversion candidate character thus selected.

Therefore, in the cellular telephone device 1, since conversion candidate characters to be displayed in the conversion candidate display area 120 and a predetermined character string are displayed in different modes, it is possible to show the user that the conversion candidate characters are displayed in the conversion candidate display area 120, or that the predetermined character string is displayed in the conversion candidate display area 120.

In addition, in a state where the initial screen (wallpaper screen) is displayed on the display unit 21, in a case in which an input character is input by the operation unit 11, the control unit 45 displays a predetermined character string in the conversion candidate display area 120. The initial screen (wallpaper screen) is a screen that is displayed on the display unit 21 on standby for an incoming telephone call or incoming mail, and on standby for activation of an application.

Therefore, in the cellular telephone device 1, an input character is input when the initial screen is displayed on the display unit 21, and in addition, by the operation unit 11 selecting a predetermined character string displayed in the conversion candidate display area 120, an application corresponding to the selected predetermined character string is activated; accordingly, a desired application can be activated, based on the input character displayed on the display unit 21.

Next, descriptions are provided for operations of the cellular telephone device 1 of the present embodiment. First of all, descriptions are provided for operations in a case in which input characters are input in a state where the wallpaper screen is displayed on the display unit 21. FIG. 10 is a sequence of views showing how the display mode changes when input characters are input in a state where the wallpaper screen is displayed on the display unit 21. FIG. 12 is a diagram showing a conversion database.

First of all, in state where the wallpaper screen is displayed on the display unit 21 (see FIG. 10A), in a case in which the operation unit 11 (numeric keys) is operated to input "I leave for home now" as input characters, the control unit 45 displays the input characters "I leave for home now" in the input character display area 110 of the display unit 21 (see FIG. 10B).

Subsequently, in a case in which the operation unit 11 (for example, the right key that configures the selection operation key 15 (see FIG. 1)) is operated to input an inconvertible symbol (a space mark), the control unit 45 displays "I leave for home now" and a space mark in the input character display area 110, and displays "email subject", "email text", "SMS mail text", "internet search" and "schedule alarm" as predetermined character strings in the conversion candidate display area 120 (see FIG. 10C). It should be noted that the SMS (Short Message Service) mail is composed of a short message (including about dozens of characters) that is transmitted by identify a destination party by a telephone number.

Subsequently, in a case in which the operation unit 11 (for example, a downward operation key that configures the selection operation key 15) is operated to select "email subject" as a predetermined character string (see FIG. 10D), the control unit 45 activates the mail application corresponding to "email subject" by the activation unit 45*a*, and inputs the input characters "I leave for home now" in the subject input area 100*a* of the mail application (see FIG. 10(*e*)).

It should be noted that, in a case in which the mail application is activated by the activation unit 45*a*, the control unit 45 may read a boilerplate phrase serving as mail text from the database stored in the memory 44, and input the boilerplate phrase in the text input area 100*b* of the mail application.

More specifically, as illustrated in FIG. 12, a boilerplate phrase as the mail subject "I leave for home now" (mail subject boilerplate phrase) and a boilerplate phrase as the mail text "I leave for home now, and will be home within 30 minutes" (mail text boilerplate phrase) are registered in association with each other in the database (EASY MAIL DB). In a case in which "email subject" is selected as a predetermined character string by the operation unit 11, the control unit 45 refers to the database stored in the memory 44, and determines whether the database includes a mail subject boilerplate phrase that coincides with the input characters displayed in the input character display area 110. In a case in which the control unit 45 determines that the database includes a mail subject boilerplate phrase that coincides with the input characters, the control unit 45 reads a mail text boilerplate phrase associated with the mail subject boilerplate phrase from the database. Furthermore, the control unit 45 inputs the input characters in the subject input area 100*a* of the mail application that is activated, and inputs the mail text boilerplate phrase, which is read from the database, in the text input area 100*b* of the mail application.

Next, descriptions are provided for first operations, in which input characters are input in a state where the wallpaper screen is displayed on the display unit 21, and thereafter another character is further input. FIG. 13 is a sequence of views showing how the display mode changes in a case in which input characters are input in a state where the wallpaper screen is displayed on the display unit 21, and a new character is input thereafter.

First of all, in a state where the wallpaper screen is displayed on the display unit 21 (see FIG. 13A), in a case in which the operation unit 11 (numeric keys) is operated to input "I leave for home now" as input characters, the control unit 45 displays the input characters "I leave for home now" in the input character display area 110 (see FIG. 13B).

Subsequently, in a case in which the operation unit 11 (for example, the right key that configures the selection operation key 15 (see FIG. 1)) is operated to input an inconvertible symbol (a space mark), the control unit 45 performs control to display "I leave for home now" and the space mark in the input character display area 110, and performs control to display "email subject", "email text", "SMS mail subject", "internet search" and "schedule alarm" as predetermined character strings in the conversion candidate display area 120 (see FIG. 13C).

Subsequently, the operation unit 11 is operated to further input a new hiragana character "e" (pronounced like "eh"). The new hiragana character is a first character in a predetermined character string corresponding to a desired application. In other words, the new character is the first character in the predetermined character string selected by the operation unit 11 from among the plurality of predetermined character strings displayed in the conversion candidate display area 120. For example, in a case in which "SMS mail subject" is selected from among the predetermined character strings "email subject", "email text", "SMS mail subject", "internet search" and "schedule alarm", the hiragana character "e" is input by the operation unit 11 (since the first character of SMS is pronounced as "es" that starts with the sound "e" of the hiragana character "e"). The memory 44 stores a table that associates a predetermined character string with the first character of the predetermined character string. In a case in which a new character is input after inputting an inconvertible symbol, the control unit 45 refers to the table stored in the memory 44, and determines whether the table stores a first character that coincides with the new character. In a case in which the control unit 45 determines that the table stores a first character that coincides with the new character, the control unit 45 displays a predetermined character string corresponding to the first character with priority over the other character strings, in the conversion candidate display area 120. For example, as shown in FIG. 13D, in a case in which the hiragana character "e" is input as a new character by the operation unit 11, the control unit 45 determines that the first character "e" in the predetermined character string "SMS mail subject" (in its pronunciation) coincides with the new character "e", and displays the predetermined character string "SMS mail subject" on top in the conversion candidate display area 120.

Subsequently, in a case in which the operation unit 11 is operated to select "SMS mail subject" as a predetermined character string, the control unit 45 activates the SMS mail application corresponding to "SMS mail subject" by the activation unit 45a, and inputs the input characters "I leave for home now" in the subject input area 100a of the SMS mail application (see FIG. 13E).

Next, descriptions are provided for second operations, in which input characters are input in a state where the wallpaper screen is displayed on the display unit 21, and thereafter another character is further input. FIG. 14 is a sequence of views showing how the display mode changes in a case in which input characters are input in a state where the wallpaper screen is displayed on the display unit 21, and a new character is input thereafter.

First of all, in a state where the wallpaper screen is displayed on the display unit 21 (see FIG. 14A), in a case in which the operation unit 11 (numeric keys) is operated to input "I leave for home now" as input characters, the control unit 45 displays the input characters "I leave for home now" in the input character display area 110 (see FIG. 14B).

Subsequently, in a case in which the operation unit 11 (for example, the right key that configures the selection operation key 15 (see FIG. 1)) is operated to input an inconvertible symbol (a space mark), the control unit 45 performs control to display "I leave for home now" and the space mark in the input character display area 110, and performs control to display "email subject", "email text", "SMS mail subject", "internet search" and "schedule alarm" as predetermined character strings in the conversion candidate display area 120 (see FIG. 14C).

Subsequently, the operation unit 11 is operated to further input a new character "s". The new character is a first character in a predetermined character string corresponding to a desired application. In other words, the new character is the first character in the predetermined character string selected by the operation unit 11 from among the plurality of predetermined character strings displayed in the conversion candidate display area 120. For example, in a case in which "SMS mail subject" is selected from among the predetermined character strings "email subject", "email text", "SMS mail subject", "internet search" and "schedule alarm", the character "s" is input by the operation unit 11. The memory 44 stores a table that associates a predetermined character string with the first character of the predetermined character string. In a case in which a new character is input after inputting an inconvertible symbol, the control unit 45 refers to the table stored in the memory 44, and determines whether the table stores a first character that coincides with the new character. In a case in which the control unit 45 determines that the table stores a first character that coincides with the new character, the control unit 45 displays a predetermined character string corresponding to the first character with priority over the other character strings, in the conversion candidate display area 120. For example, as shown in FIG. 14D, in a case in which the character "s" is input as a new character by the operation unit 11, the control unit 45 determines that the first character "s" in the predetermined character string "SMS mail subject" coincides with the new character "s", and displays the predetermined character string "SMS mail subject" on top in the conversion candidate display area 120.

Subsequently, in a case in which the operation unit 11 is operated to select "SMS mail subject" as a predetermined character string, the control unit 45 activates the SMS mail application corresponding to "SMS mail subject" by the activation unit 45a, and inputs the input characters "I leave for home now" in the subject input area 100a of the SMS mail application (see FIG. 14E).

Third Embodiment

Figure 15:
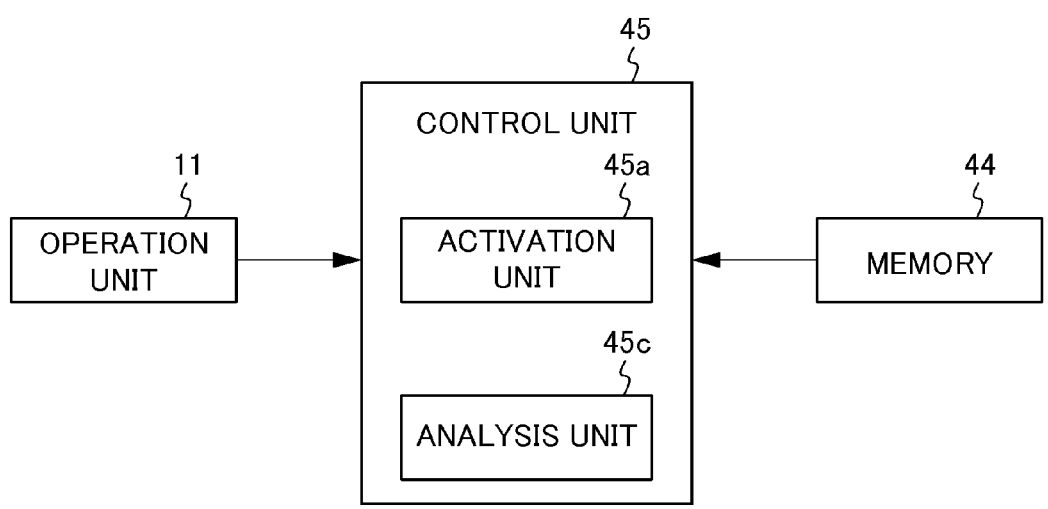
FIG. 15 is a functional block diagram showing a configuration for a cellular telephone device according to a third embodiment to achieve a function.

Next, a third embodiment is described. FIG. 15 is a functional block diagram showing a configuration for a cellular telephone device 1 according to the third embodiment to achieve a function.

The cellular telephone device 1 further includes an analysis unit 45c. The analysis unit 45c analyzes an input character that is input by the operation unit 11. For example, the analysis unit 45c performs analyses such as whether the input characters are composed of only a word(s), whether the input characters are composed of a single sentence, whether the input characters include a line feed symbol indicating a line feed of a sentence, whether the input characters include time information (numeric characters), whether the input characters include a space mark, or whether the input characters include at least two periods (Japanese periods).

Based on the results of the analyses by the analysis unit 45c, the control unit 45 changes the display order of the predetermined character strings displayed in the conversion candidate display area 120. For example, in a case in which the analysis unit 45c analyzes that the input characters are composed of only a word(s), the control unit 45 refers to a table illustrated in FIG. 16, and changes the order of the predetermined character strings displayed in the conversion candidate display area 120 to "internet search", "kanji character proofread", "dictionary" and "email subject".

It should be noted that FIG. 16 is a table for determining the display order of predetermined character strings. The table shown in FIG. 16 is used for determining the order of a plurality of predetermined character strings that are displayed in the conversion candidate display area 120, based on results of analyses by the analysis unit 45c. The numbers described in the table denote the display order. For example, in a case in which the input characters include at least two periods (Japanese periods), "email text" is the first in the display order, "memo pad" is the second in the display order, and "schedule" is the third in the display order; therefore, the control unit 45 displays the predetermined character strings in the conversion candidate display area 120 in the order of "email text", "memo pad" and "schedule".

Therefore, based on results of analyses by the analysis unit 45c, the cellular telephone device 1 converts the display order of predetermined character strings displayed in the conversion candidate display area 120; accordingly, a predetermined character string corresponding to a desired application can be displayed with priority over the other character strings in the conversion candidate display area 120.

Fourth Embodiment

Next, a fourth embodiment is described. A cellular telephone device 1 according to the fourth embodiment has a configuration that is the same as the configuration shown in the functional block diagram of FIG. 9.

Memory 44 stores an activation number of times an activation unit 45a activates each application. In other words, each time the activation unit 45a activates an application, the control unit 45 increments a variable by 1, in which the variable represents the activation number of times of each application, and is stored in the memory 44.

Based on the activation number of times of each application stored in the memory 44, the control unit 45 displays predetermined character strings in descending order of the activation number of times, in the conversion candidate display area 120. In other words, in a case in which predetermined character strings are displayed in the conversion candidate display area 120, the control unit 45 refers to the variable that represents the activation number of times of each application stored in the memory 44, and displays predetermined character strings corresponding to applications having larger variables, with higher priority, in the conversion candidate display area 120.

Therefore, the cellular telephone device 1 can display predetermined character strings in the conversion candidate display area 120 by giving priority to predetermined character strings corresponding to applications that are frequently activated.

It should be noted that the above descriptions have been provided for each case, in which the first to fourth embodiments are individually implemented. However, the first to fourth embodiments may be implemented in combination. For example, the first and second embodiments can be utilized in combination.

Moreover, the aforementioned embodiments have been described by illustrating the cases in which the present invention is applied to the cellular telephone device 1. However, the present invention is not limited to the aforementioned embodiments, and may also be applied to an electronic device such as a PHS (Personal Handyphone System) and a PDA (Personal Digital Assistant).

The invention claimed is:

1. An electronic device, comprising:
a processor configured to activate an application having a plurality of character input areas to receive input characters; and
a display configured to display
an input character string, which is input by a user, in a first display area,
a new character, which is input by the user after the input character string, in the first display area, and
a plurality of predetermined character strings, one of which corresponds to the application, in a second display area,
wherein, when the one of the predetermined character strings which is displayed in the second display area is selected by the user, the processor is configured to
activate the application corresponding to the one predetermined character string thus selected, and
input the input character string in a character input area among the plurality of character input areas of the application,
wherein,
after the input character string is input and in response to an input of an inconvertible symbol, that cannot be converted, in the first display area, the processor is configured to cause the display to start displaying the plurality of predetermined character strings in the second display area,
in response to an input of the new character after the input of the inconvertible symbol, the processor is configured to cause the display to display one of the plurality of predetermined character strings with priority within the plurality of predetermined character strings and on top of a list of the plurality of predetermined character strings in the second display area, and
wherein said one of the plurality of predetermined character strings corresponds to the new character.

2. The electronic device according to claim 1, wherein the input character string includes a first input character string and a second input character string.

3. The electronic device according to claim 1, wherein, when the processor activates a search application to perform a search based on the input character string that is input in the first display area, the processor is configured to display a movable operation cursor on a screen corresponding to the search application and in a predetermined position on the display.

4. The electronic device according to claim 1, further comprising a memory configured to store the plurality of predetermined character strings,
wherein, the memory is configured to further store (i) the input character string and (ii) the application that is to be activated by the processor, in association with each other.

5. The electronic device according to claim 1, wherein the processor is configured to analyze the new character that is input,
  wherein the processor is configured to change a display order of the plurality of predetermined character strings displayed in the second display area and display said one of the plurality of predetermined character strings with priority over others of the plurality of predetermined character strings, based on a result of an analysis by the processor.

6. The electronic device according to claim 4,
  wherein the processor is configured to activate a plurality of applications including said application, the plurality of applications having corresponding character input areas to receive input characters,
  wherein the memory is configured to store an activation number of times the processor activates each of the plurality of applications, and
wherein, based on the activation number of times of each of the plurality of applications, which is stored in the memory, the processor is configured to display the plurality of predetermined character strings in a descending order of the activation numbers of times, in the second display area.

7. The electronic device according to claim 1,
  wherein the input character string and conversion candidate characters converted from the input character string displayed in the first display area are displayed in the second display area, and
  wherein the input character string and the conversion candidate characters are displayed in different modes.

8. The electronic device according to claim 1, wherein, in a state where an initial screen is displayed on the display, when the input character string is input, the processor is configured to display the character string in the second display area.

9. The electronic device according to claim 1, further comprising a memory configured to store the plurality of predetermined character strings,
  wherein the plurality of character input areas of the application includes
    a subject input area corresponding to one of the plurality of predetermined character strings; and
    a text input area different from the subject input area, and
  wherein the display is configured to display, in the text input area, said one of the plurality of predetermined character strings stored in the memory and corresponding to the input character string.

10. The electronic device according to claim 1, wherein the display is configured to display the inconvertible symbol including a space mark, a pound sign, or an asterisk.

* * * * *